(12) United States Patent
Jalkanen et al.

(10) Patent No.: US 8,930,574 B2
(45) Date of Patent: Jan. 6, 2015

(54) VOICE AND OTHER MEDIA CONVERSION IN INTER-OPERATOR INTERFACE

(75) Inventors: Tero Jalkanen, Tuusula (FI); Jari Weckman, Lempäälä (FI)

(73) Assignee: Teliasonera AB, Stockholm (SE)

(*) Notice: Subject to any disclaimer, the term of this patent is extended or adjusted under 35 U.S.C. 154(b) by 0 days.

(21) Appl. No.: 12/658,326

(22) Filed: Feb. 9, 2010

(65) Prior Publication Data
US 2010/0211691 A1  Aug. 19, 2010

(30) Foreign Application Priority Data
Feb. 16, 2009 (EP) ..................... 09152906

(51) Int. Cl.
- G06F 15/16 (2006.01)
- H04L 29/06 (2006.01)
- H04M 7/00 (2006.01)

(52) U.S. Cl.
CPC ........... *H04L 65/104* (2013.01); *H04M 7/0003* (2013.01); *H04L 65/1006* (2013.01)
USPC .......................................... 709/246; 709/206

(58) Field of Classification Search
CPC .................... H04L 12/1446; H04L 29/06027; H04L 65/1006; H04L 65/1016; H04L 65/1069; H04L 65/1096
USPC .......................................................... 709/246
See application file for complete search history.

(56) References Cited

U.S. PATENT DOCUMENTS

| | | | |
|---|---|---|---|
| 6,058,115 A * | 5/2000 | Sawyer et al. ................ 370/401 |
| 6,363,431 B1 * | 3/2002 | Hammer et al. .............. 709/249 |
| 6,563,919 B1 * | 5/2003 | Aravamudhan et al. ...... 379/230 |
| 6,985,961 B1 * | 1/2006 | Ramsayer et al. ............ 709/238 |
| 7,613,170 B1 * | 11/2009 | Grabelsky et al. ............ 370/352 |
| 2001/0046234 A1 * | 11/2001 | Agrawal et al. .............. 370/402 |
| 2004/0109518 A1 * | 6/2004 | Miller et al. .................. 375/356 |
| 2004/0153703 A1 * | 8/2004 | Vigue et al. ...................... 714/4 |
| 2005/0228863 A1 * | 10/2005 | Palmeri et al. ............... 709/205 |
| 2006/0095968 A1 * | 5/2006 | Portolani et al. ................ 726/23 |

FOREIGN PATENT DOCUMENTS

WO  WO 2007042620 A1 *  4/2007

\* cited by examiner

*Primary Examiner* — Christopher Biagini
(74) *Attorney, Agent, or Firm* — Cozen O'Connor

(57) ABSTRACT

An apparatus receives a protocol invitation communication from an originating operator and targeted to a receiving operator in a communications system. The apparatus intercepts the communication and checks whether the originating operator and the receiving operator use the same protocol for the protocol invitation communication. If the receiving operator uses another protocol, the apparatus performs a conversion from the originating operator's protocol to the receiving operator's protocol and forwards the converted protocol invitation communication towards the receiving operator.

14 Claims, 3 Drawing Sheets

VOICE AND OTHER MEDIA CONVERSION IN INTER-OPERATOR INTERFACE

BACKGROUND OF THE INVENTION

1. Field of the Invention

The present invention relates to inter-operator connections, and more particularly to inter-operator connections and media conversion in IP based networks such as IPX networks.

2. Description of the Related Art

In an ideal communications world everybody uses exactly the same services with exactly the same protocols. This would lead to the fact that no conversions are needed between different end points and operators.

A service provider in a communication network provides services to other entities and users in said network. An end user is a person who uses said services. If in the communications network there exist two different operators using a different mechanism or a different protocol for the same service, a technical problem must be overcome: how can the operator or the service provider conveniently arrange a connection to another operator for the end user to use said service(s). In one example an operator A is using MSC-S and MGW (mobile services switching center—server and multimedia gateway) nodes for basic voice services using ITU-T (International Telecommunication Union, Telecommunication Standardization Sector) compliant SIP-I (session initiation protocol) protocol. The operator A wants to have a voice interconnection agreement with an operator B that is using the IMS (Information Management System) core system instead of MSC-S and with an operator C that is using the traditional PSTN/TDM (Public Switched Telephone Network/Time-Division Multiplexing) core system. To allow the above kind of the voice interconnection to take place, it must be known which operator is using which mechanism, and necessary modifications must also be performed. Prior art does not allow said voice interconnection to take place in an effective manner.

SUMMARY OF THE INVENTION

An object of the present invention is to provide a method and an apparatus for implementing the method so as to solve the above problems. The objects of the invention are achieved by a method and an arrangement, which are characterized by what is stated in the independent claims. The preferred embodiments of the invention are disclosed in the dependent claims.

The invention is based on the idea of the operators or other service providers having the capability of routing towards the most optimal node using the most optimal signalling and media protocols when receiving communication from an operator using multiple different network nodes that all could potentially offer the required service but some nodes would still be better suited than others. For example a receiving end having both MSC-S and IMS core system or network nodes, can offer the packet switched voice service, but if the originating end is using MSC-S, it is optimal that MSC-S is used also in the receiving end.

The invention offers means for an Internet packet exchange IPX Proxy or a similar node to intercept an incoming request, to check for the need of modification and to perform the modification if needed especially related to voice and video calls. Thus, from an end-operator point of view an inter-operator interface always stays the same regardless of what kind of servers and/or protocols the other operator is actually using. If needed, conversion can also take place in the originating operator's premises using the IPX Proxy delivered information regarding the receiving operator.

An advantage of the method and the arrangement of the invention is that end-operators themselves need not necessarily care about the details of the other end, since IPX Proxy or a similar node is taking care of required conversions, if any. On the other hand, those operators that would like to perform those potential conversions themselves can retrieve the necessary information on the receiving end capabilities from the IPX Proxy or the similar node.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

The field of the invention is inter-operator connections, which relate especially to IP (internet protocol) based networks, such as an IPX (internetwork packet exchange) network. The purpose of the invention is to allow a feasible mechanism for an IPX Proxy provider to allow end-operators and/or service providers to outsource conversions and transcodings needed especially in voice and video connections. The invention and its embodiments can be applied to different kinds of media, like voice, data, telefax, video, and email etc. provided that the operators and/or the inter-operator network has the capabilities of performing conversions for that particular media. The invention and its embodiments can be applied to mobile 2G ($2^{nd}$ generation), 2.5G ($2.5^{th}$ generation), 3G ($3^{rd}$ generation) and 4G ($4^{th}$ generation) environments as well as different fixed environments such as NGN (Next Generation Network), SoftSwitch, TISPAN and VoIP based network communications networks, systems and elements and to terminal equipment using said networks and systems. The invention and its embodiments can be applied to mobile networks and fixed networks and their equipment and to different access networks.

Figure 1:
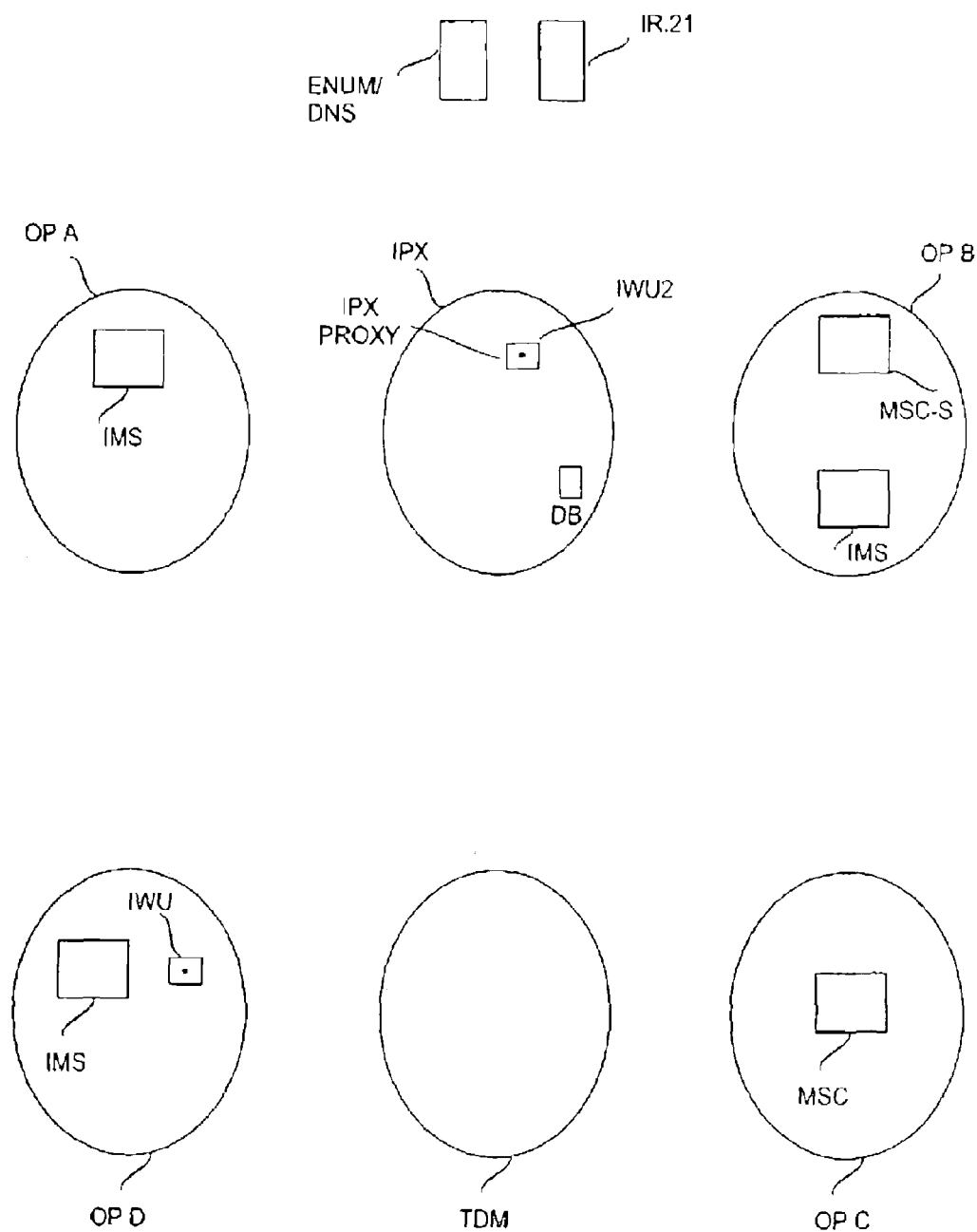
FIG. 1 shows a block diagram according to the invention and its embodiments.

FIG. 1 shows a block diagram according to the invention and its embodiments. It shows an example with four different operators OP A, OP B, OP C and OP D, which operators can provide e.g. services in the same or different networks. An internet work packet exchange element or an IPX element, which is shown between the operators A and B is for transferring data, information and communication from an originating party or operator to a receiving party or operator. The Internet work or the internet packet exchange is a network layer protocol therefor. The IPX Proxy inside the IPX area is a device for managing a transfer session.

FIG. 1 also shows two IWU units, namely IWU and IWU2. They are interworking units and are for receiving data, information and communication from a first network element or entity or operator and for transferring or forwarding it to a second network element or entity or operator. The first IWU is located in this example as a separate entity inside the operator D and the second IWU is located inside the IPX Proxy element and inside the IPX element. The IMS elements, which are here shown to be inside of the operators A, B and D, are information management systems that can be described as a joint hierarchical database and information management system with extensive transaction processing capabilities.

ENUM/DNS is an element for (ENUM, Enumeration; DNS, Domain Name Server) naming computers, services, or some or any resource participating in the Internet and/or packet mode data transfer. The element IR.21 is used in this invention as a general GSM Association roaming and interconnection database, including information such as IP addresses of operator network nodes that are relevant to roaming and interconnection purposes.

TDM is a multiplexing technique (Time Division Multiplexing), which describes in this invention the traditional non-IP based network which is used for circuit switched voice traffic nationally and internationally.

FIG. 1 also shows an MSC element to be located inside of the operator C. The element describes a mobile services switching center and it is a mobile network element, which can perform different functions such as controlling interworking with other networks. In this invention said element controls voice traffic related to traditional circuit switched environment, i.e. connected to TDM network. MSC-S is the element for transporting circuit switched voice traffic over IP-based network such as IPX, i.e. responsible for mapping CS voice into IP packets (and vice versa).

The invention and its embodiments can comprise one or more different databases DB. The databases can be inside of the operators or network element areas or in communication with said elements. The database is a collection of records or data and it can be structured in many different ways.

Different elements of the invention and its embodiments can be organized as shown in FIG. 1. However, they can also be organized alternatively. The elements can also be implemented in several ways. They can be programmed e.g. in a computer or in a server. A computer program can comprise program code means adapted to perform any of the necessary steps, when the program is run on a processor. Thus, all modifications and configurations required for implementing functionality of the embodiments may be performed as routines, which may be implemented as added or updated software routines, application circuits ASIC and/or programmable circuits. Software routines, also called program products, including applets and macros, can be stored in any apparatus-readable data storage medium and they include program instructions to perform particular tasks. Software routines may be downloaded into an apparatus. The apparatus, like server components, or a user terminal may be configured as a computer including at least a memory for providing storage area used for an arithmetic operation and an operation processor for executing the arithmetic operation. An example of an operation processor includes a central processing unit. The memory may be removable memory detachably connected to the apparatus.

Figure 2:
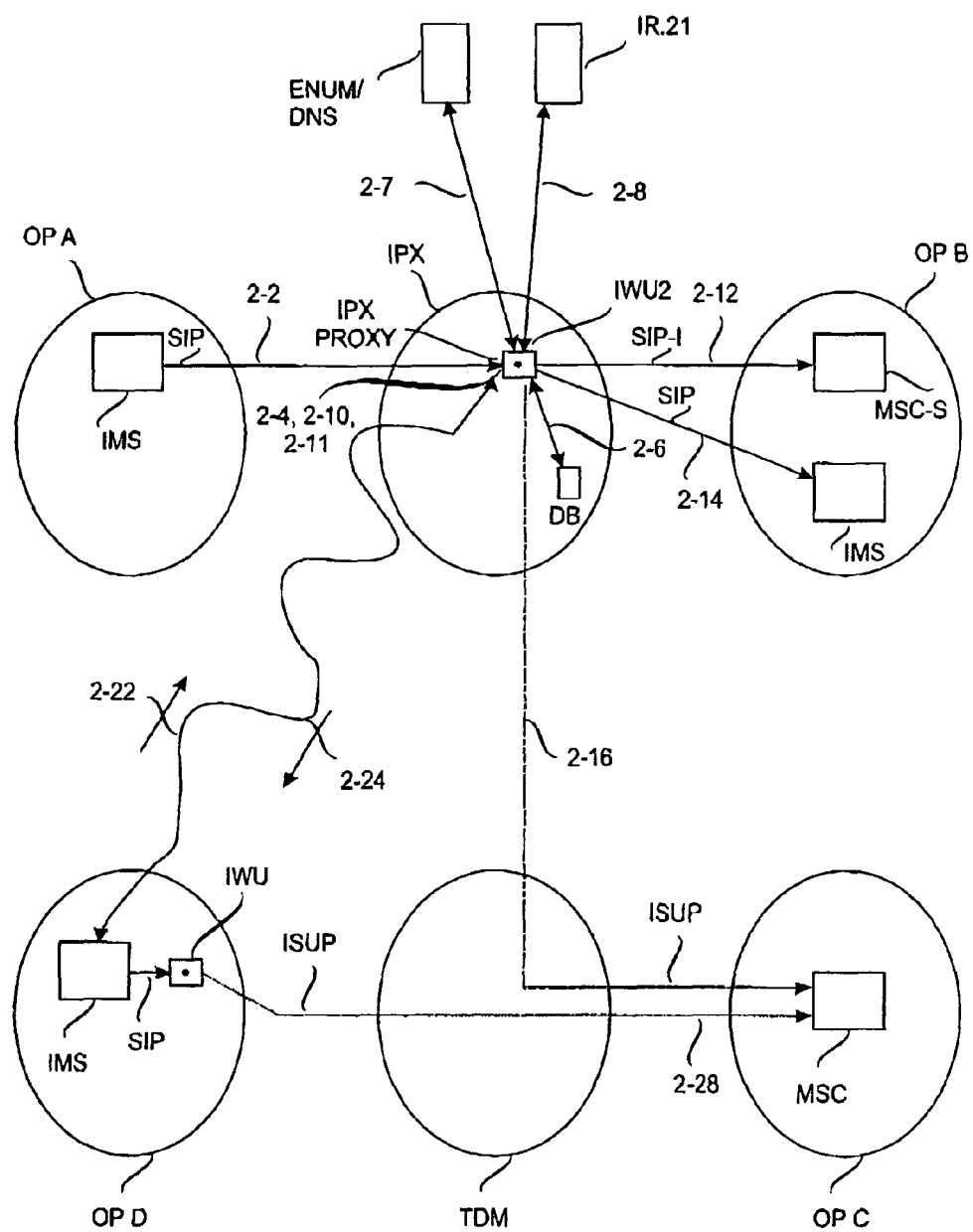
FIG. 2 shows a signalling diagram according to the invention and its embodiments.

FIG. 2 shows a signaling diagram according to the invention and its embodiments. In step 2-2 a first operator, Operator A, OP A sends a SIP INVITE message related to a voice connection initiation towards a second operator, operator OP B using its IMS core system. Therefore also the normal SIP protocol is used. In step 2-4 an IPX Proxy gets the invite message, and in step 2-6 checks it. In checking the operator finds out that the message is related to the voice connection and that OP B has a preference of using its MSC-S node for voice. In processing this the IPX Proxy can use its own database DB, which can contain technical and other information e.g. on different or all operators and their capabilities. This can be a part of its own commercial interconnection agreements. Also other sources such as the common ENUM/DNS (enumeration/domain name system) of the IPX network and the normal roaming and interworking database of GSMA (GSM Association) i.e. IR.21 can be used in steps 2-7 and 2-8. In addition to or alternatively another database(s) can be used locating outside of the IPX Proxy. After that the IPX Proxy can use its IWU interworking unit function and convert the SIP protocol message into SIP-I protocol message in step 2-10.

In other words the operator B can have and use both MSC-S and IMS systems and both of them can realize the service e.g. the packet-based voice service. It must also be decided to which element the invite message is sent and in which form the message is forwarded. The forms for packet-based voice service can be SIP, SIP-I, SIP-T, or BICC and various proprietary protocols. Other services like video service can use different protocols or protocol sets.

In step 2-12 the IPX Proxy forwards the invite message in SIP-I format towards the IP address of OP B MSC-S node, and forwards the invite message in SIP format towards the IP address of OP B IMS node in step 2-14. The operators OP A and OP B can thus set different preferences. Preference means the method or mechanism that the receiving end uses to route traffic in its own network towards different network nodes, for example balancing incoming traffic between MSC-S and IMS platforms based on the traffic load each node is currently having. One preference example is that OP B can choose the element at least partly on the basis of the type of the incoming traffic. In one embodiment all SIP based incoming traffic is routed to the IMS node of OP B and all SIP-I based incoming traffic is routed to the MSC-S node of OP B. The IPX Proxy and an IWU element IWU2 can make the choice of selecting towards which OP B network node the traffic is sent. This choice is influenced by technical capabilities of the receiving apparatus and element and one or more separate operator-specific preferences based on various operational policies that particular operator has decided to utilize for its own core network. The IWU element IWU2 is for the operators OP A and OP B. It can be outsourced meaning that operators themselves are not hosting the IWU element but rather an external party such as IPX carrier hosts IWU on behalf of operators (based on commercial agreement between the parties). An operator OP D can use its own IWU element.

If OP A had sent another kind of invitation, such as an instant messaging invitation, the IPX Proxy would have noticed it in step 2-11 and had forwarded it towards the OP B IMS core system as a normal SIP protocol message in step 2-14, according to the preference(s) and capability (capabilities) set by OP B. On the basis of this information it is possible to know what exact node OP B would like to use for incoming traffic. It is thus possible for OP B to set one or more preferences that all incoming traffic using pure SIP protocol would always be routed towards the IMS core, while all incoming traffic using SIP-I would always be routed towards the MSC-S element, regardless of what the originating operator actually addresses. In one embodiment, OP A has only the knowledge of OP B's IMS, and OP A does not even know OP B's MSC-S, since the IPX Proxy is responsible for hiding this information. OP A can thus know one or more OP B's elements.

In step 2-10, if OP A had sent a voice call related invitation towards OP C, the IPX Proxy would have noticed it in step 2-11, performed a PSTN breakout in step 2-16 and forwarded the voice call related invitation using traditional TDM/PSTN network towards MSC OP C on the basis of a preference set by OP C and its technical capabilities that were discovered e.g. during a IPX Proxy DB query in step 2-6. So, in this situation, for OP C all incoming voice and video calls are converted into the ISUP/TDM format, even though e.g. OP A is not or does not have to be aware of this, since the IPX Proxy is hiding the conversion from it.

In FIG. 2, the operator OP D is also using the IPX network, but performing all conversions and transcodings by itself. However, OP D is still using the IPX Proxy in order to obtain relevant information regarding the other operators. When OP D makes a voice call request towards OP C in step 2-28, it can first perform a query to the IPX Proxy in step 2-22 asking for OP D capability information. On the basis of the response in step 2-24 OP D can utilize its own IWU interworking unit to convert the SIP protocol coming from its IMS core system into a conventional ISUP/TDM request that is then forwarded towards the TDM element such as to MSC (Mobile Switching Centre) or some other kind of voice switch. As shown in FIG. 2, the IWU element can be located in the OP D operator or alternative in the IPX Proxy.

The IPX Proxy can find out, whether an incoming invitation (SIP INVITE; session invitation protocol invite message) is using pure SIP (in IMS information management system) protocol or message or SIP-I (in MSC-S, mobile services switching centre system) protocol or message and can route the invitation accordingly. The routing can be based, for example, on SIP SDP (session description protocol) information. When a call or communication is to be set up, the originating party can start said set-up by sending first said SIP message.

Actions such as a breakout to TDM (time division multiplexing) or route to MSC-S via IPX or route to IMS can be utilized inside an IPX exchange based at least partly on information the IPX Proxy has, regarding the end-operators and their capabilities via queries to external database(s) and internal database(s). The breakout can be the change of the circuit switched traffic into the packet switched traffic or vice versa. In one embodiment the communication transfers from the IP based voice communication into TDM or PSTN based circuit switched voice communication e.g. for reaching also those operators that have not updated themselves to be new IP based operators but still use the old TDM technique.

According to the invention and its embodiments the originating operator(s) can outsource advanced routing logic to the IPX exchange, which can then automatically use the most optimal routes, correct end-points, right protocols and most usable media codecs for the terminating operator according to its preferences.

For example only SIP-I protocol can be presented as the only method for voice interworking for Operator A sending traffic towards other operators, even though in practice also e.g. the TDM breakout and pure IMS interworking systems would be supported by IPX Proxy performing conversion towards those operators that require it.

One item is FNO (Fixed Network Operator) using the fixed IMS or fixed MSC-S/SoftSwitch node that might be slightly different from MNO (Mobile Network Operator) using mobile IMS/MSC-S (such as ITU-T SIP-I vs. 3GPP (3rd Generation Partnership Project) SIP-I). In other words, IPX exchange can mask technical details. In one embodiment FNO uses just SIP-I protocol and does not care about IMS, while ISP would use just SIP protocol and does not care about SIP-I protocol.

In the invention one or more network elements comprise means for receiving a protocol invitation communication from an originating operator and targeted to a receiving operator in a communications system and intercepting said communication or means for intercepting a protocol invitation communication from an originating operator and targeted to a receiving operator in a communications system; intercepting said communication; checking whether the originating operator and the receiving operator uses the same protocol for the protocol invitation communication; if the receiving operator uses another protocol for the protocol invitation communication, performing a conversion from the originating operator's protocol to the receiving operator's protocol; and forwarding said converted protocol invitation communication towards the receiving operator. Said means can be processors, ASIC circuits, computer programs, digital processors, analog circuits, different electronic processing blocks and a combination thereof.

Furthermore, in the invention the means for checking may comprise means for finding out the incoming media type of the protocol invitation communication and finding out what network node of the receiving operator is to be used for said media type. The network nodes can be of type IMS and MSC-S or other type for packet mode and switched circuit type communication for different types of media. It is also possible that some part of the media or communication is to be forwarded to a first network node and other part of the same media or communication is to be forwarded to a second network node.

The receiving operator may comprise means for setting one or more rules that all incoming protocol invitation communication using a first protocol is routed towards a first network node of the receiving operator and that all incoming protocol invitation communication using a second protocol is routed towards a second network node of the receiving operator regardless of the target address of the network node the originator operator has defined. The first protocol and the second protocols can be e.g. of type SIP, SIP-I or ISUP.

The above mentioned means for checking can further comprise means for retrieving routing and/or media type information from a database in the intermediary proxy, which proxy is located between the originating operator and the receiving operator.

The methods of the invention and its embodiments can be processed with one or more computers. A computer readable medium can comprise a program, which when run on the computer, will cause the computer to perform the method steps of the invention and its embodiments.

Figure 3:
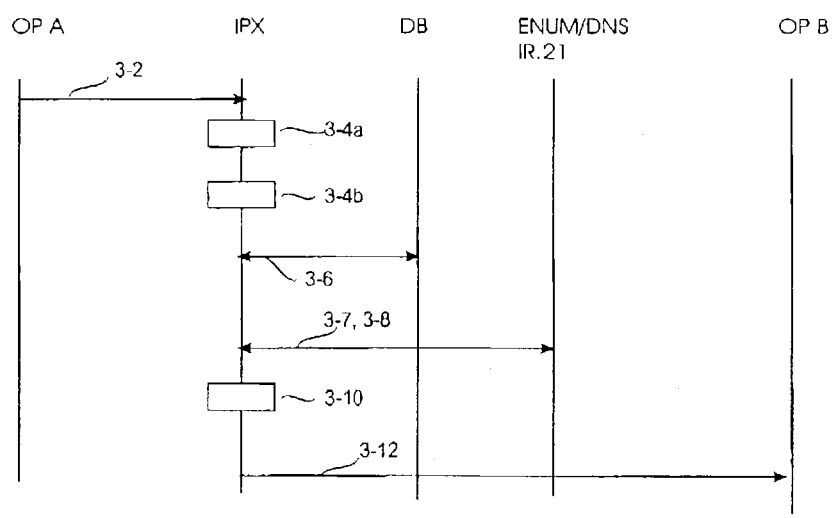
FIG. 3 shows a signalling graph according to the invention and its embodiments.

FIG. 3 shows a signaling graph according to the invention and its embodiments. As disclosed above in the connection with FIG. 2, in step 3-2 a communication is sent from the operator OP A and received by the IPX element. The IPX element or some element inside it can intercept to the transmission in step 3-4a according to a predetermined manner, e.g. triggered by a triggering event. In step 3-4b the element may make some checks. It can retrieve (and/or store) data or information from (to) the database DB in step 3-6 and retrieve (and/or store) data or information from (to) the ENUM element/DNS element and from the IR.21 element in steps 3-7, 3-8 respectively and. For example, if the communication was originally addressed to a certain network node of OP B, but it would be more optimal to use another network node of OP B, this more optimal network node can be used. It is also possible that some of the communication, or a first part of the communication, is forwarded towards the original addressed network node and some of the communication, or a second part of the communication, is forwarded to another network node. After that the IPX element can make one or more conversions, adjustments, changes or modifications to the whole or part of the communication in step 3-10 for optimal transmission and for other reasons. In step 3-12 the whole or part of the communication is forwarded or sent towards the receiving end OP B.

One of the main problems the present invention solves is how to route towards the most optimal node and how to use the most optimal signalling and media protocols, while a number of operators utilizes both MSC-S and IMS protocols.

In one embodiment different speech codecs and SIP profiles can be adapted to another on an application level. For example, IPX Proxy can process this adaptation. In another embodiment, on a routing level, optimal routing choice or selection can be made between two different apparatuses or elements, which have the same or substantially the same capabilities. These can be e.g. IMS and MSC-S. The steps of processing these different levels can be e.g. such that first the routing steps are processed and then different conversions can be processed.

In one embodiment of the invention, the IPX Proxy can also be used as a database DB for the end-operators about capability information know-how regarding the other end. This can comprise, for example, what kind of services it is worth sending to the other end. The IPX Proxy can gather all the relevant information and sell or send it onwards, for example towards operators that would like to perform all conversions and transcoding by themselves, but which operators are not fully aware of the capabilities of the other operators. Alternatively, the IPX Proxy can perform all changes, all conversions and transcodings. In other words, the IPX Proxy would be seen as a general IWU (interworking unit) from MSC-S and IMS point of view.

Invention offers means for IPX Proxy (or similar node) to intercept an incoming request, check for the need of modification and perform the modification if needed especially related to voice and video calls, so that from an end-operator point of view inter-operator interface always remains the same regardless of what kind of servers/protocols the other operator is actually using. If needed, conversion can also take place in the originating operator premises using IPX Proxy delivered information regarding the receiving operator.

In addition to voice and other media conversions also SMS (short message service) and SIGTRAN (protocol by IETF, Internet Engineering Task Force, signaling transmission working group) conversions can be made for message signaling for voice over IP services. As described above, for speech, the IPX Proxy can make conversion between SIP-I and TDM. The IPX Proxy can also make conversions for SMS signaling. The proxy can have information or can access information on the recipient operator's technical capabilities and/or preferences. The proxy can thus have information whether the receiving, the recipient operator wants to have its SMS traffic via the traditional SS7 (signalling system number 7) network or whether the operator is capable of receiving information via an IP network, the operator has e.g. updated itself for IP network. If this is the case, the IPX Proxy can take care that the traffic remains at the IPX Proxy and that it is in accordance with the SIGTRAN protocol. If e.g. 70% of the operators worked in SS7 domain, in view of the transmitting operator all the operators would use e.g. SIGTRAN protocol, because the IPX Proxy can hide those 70% of the operators. In the traditional case the IPX Proxy has to make a breakout to the SS7 network and convert the traffic from the IP based SIGTRAN traffic into the old fashioned MAP traffic.

As described above in the case of voice where the IPX Proxy is used as the database and the transmitting operator itself makes the needed protocol conversions on the basis of the capabilities of the other end, the same applies to the case for message signaling, like SMS signaling.

The field of the invention is inter-operator connections, related especially to an IP based network such as IPX. Purpose of the invention is to allow a feasible mechanism for an IPX Proxy provider to allow end-operators/service providers to outsource conversions and transcodings needed especially in voice and video connections.

The invention and its embodiments provide many advantages. The solution is based on standardized equipment and it does not require any kind of additional modifications for end-operators. Because the solution is mainly based on the IPX Proxy masking things from end-points, there is no need for the end-points themselves to set up multiple different overlapping mechanisms and databases for the purpose. Moreover, the solution offers the means to use the IPX Proxy only as a global database DB for the end-operator capabilities, i.e. it is also possible for those operators who want to use their own nodes for conversion to do so on the basis of the information they acquire from the IPX Proxy.

The invention and its embodiments are applicable for all kinds of services and applications, provided that the IPX Proxy has the capability of perform the necessary conversions needed. For example video and fax calls are feasible. In addition, e.g. IMS-based more advanced video format(s) can be transcoded into a more traditional 3GPP compliant video format that also the receiving end MSC-S node can understand.

The invention and its embodiments may be used as a value added service on behalf of the IPX provider that would enhance the desirability of IPX as a concept as well as increase the amount of money IPX is bringing in. It is now also possible to allow the operators and service providers to ignore the complexity of multiple different solutions, protocols and mechanisms possible in the inter-operator interface. In addition, the invention and its embodiments allow operators to update and/or modify their core network, such as to add the IMS core system in addition to the existing MSC-S system without having to inform others that this kind of major change has taken place.

The invention can be implemented as a non-interoperable system, but as a proprietary system.

The invention has a drawback that it is specific to a given service, such as voice only and that it requires modifications to the core network of the existing operator or the service provider.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method, comprising
intercepting, in an apparatus of an inter-operator network, a session invitation protocol (SIP) invite request sent by an originating operator in a first communication network and targeted to a receiving operator in a second communication network, the inter-operator network being arranged between the first communication network and the second communication network;
detecting from the intercepted SIP invite request the receiving operator and a form of the SIP protocol used by the originating operator;
retrieving the form of SIP protocol used by the receiving operator;
checking, in the apparatus, whether the originating operator and the receiving operator use the same form of SIP;
if the receiving operator uses another form of SIP, performing, in the apparatus, a conversion from the originating operator's form of SIP protocol to the receiving operator's form of SIP protocol to produce a converted form of SIP invite request; and
forwarding a first part of said converted form of SIP invite request towards an originally-addressed network node of the receiving operator and a second part of said converted form of SIP invite request towards another network node of the receiving operator, whereby an inter-operator interface stays the same for the originating operator.

2. The method according to claim 1, wherein the checking comprises finding out the incoming media type of the form of SIP and finding out what network node of the receiving operator is to be used for said media type.

3. The method according to claim 1, further comprising:
setting by the receiving operator a rule that at least one of incoming SIP invite requests using a first form of SIP protocol is routed towards a first network node of the receiving operator and that at least one of incoming SIP invite requests using a second form of SIP protocol is routed towards a second network node of the receiving operator regardless of the target address of the network node the originating operator has defined.

4. A non-transitory computer readable medium comprising a program, which when run on a computer, will cause the computer to perform the method steps of claim 1.

5. The non-transitory computer readable medium according to claim 4, wherein the program, when run on a computer, will cause the computer to further perform during checking: finding out the incoming media type of the form of SIP and finding out what network node of the receiving operator is to be used for said media type.

6. The non-transitory computer readable medium according to claim 4, wherein the program, when run on a computer, will cause the computer to further route at least one of incoming SIP invite requests using a first form of SIP towards a first network node of the receiving operator and at least one of incoming SIP invite requests using a second protocol towards a second form of SIP node of the receiving operator regardless of the target address of the network node the originating operator has defined in response to a corresponding rule being set by the receiving operator.

7. The non-transitory computer readable medium according to claim 4, wherein the program, when run on a computer, will cause the computer to further perform during checking: retrieving at least one of routing and media type information from a database.

8. An apparatus of an inter-operator network, the apparatus comprising:
at least one processor; and
at least one memory including computer program code, the at least one memory and the computer program code configured to, with the at least one processor, cause the apparatus at least to:
intercept a session invitation protocol (SIP) invite request received from an originating operator in a first communication network and targeted to a receiving operator in a second communication network, the inter-operator network being arranged between the first communication network and the second communication network;
detect from the intercepted SIP invite request the receiving operator and a form of the SIP protocol used by the originating operator;
retrieve the form of SIP protocol used by the receiving operator;
check whether the originating operator and the receiving operator use the same form of SIP;
if the receiving operator uses another form of SIP, perform a conversion from the originating operator's form of SIP protocol to the receiving operator's form of SIP protocol to produce a converted form of SIP invite request; and
forward a first part of said converted form of SIP invite request towards an originally-addressed network node of the receiving operator and a second part of said converted form of SIP invite request towards another network node of the receiving operator, whereby an inter-operator interface stays the same for the originating operator.

9. The apparatus according to claim 8, wherein the at least one memory and the computer program code configured to, with the at least one processor, further cause the apparatus at least to determine the incoming media type of the form of SIP and determine what network node in the first network is to be used for said media type.

10. The apparatus according to claim 8, wherein the at least one memory and the computer program code configured to, with the at least one processor, further cause the apparatus at least to:
obtain a rule set by the receiving operator, the rule defining that at least one of incoming SIP invite requests using a first form of SIP is routed towards a first network node of the receiving operator and that at least one of incoming SIP invite requests using a second form of SIP is routed towards a second network node of the receiving operator; and
route the SIP invite request using toward the network node determined by the rule regardless of the target address of the network node the originating operator has defined.

11. An apparatus according to claim 8, wherein the at least one memory and the computer program code configured to, with the at least one processor, further cause the apparatus at least to retrieve at least one of routing and media type information from a database.

12. A communications system comprising at least:
a first network having an originating operator and supporting at least a first form of session invitation protocol (SIP) for transmitting a communication;
a second network having a receiving operator and supporting at least the first form of SIP and a second form of SIP for transmitting the communication, one of the at least first and second form of SIP being indicated by the receiving operator as a preferred form of SIP for transmitting the communication; and an inter-operator network between the first network and the second network, the inter-operator network comprising an intermediate network node configured to:
- intercept an invitation for the communication from the originating operator and targeted to the receiving operator;
- detect from the intercepted SIP invite request the receiving operator and the form of the SIP protocol used by the originating operator;
- retrieve the form of SIP protocol used by the receiving operator;
- check whether the preferred form of SIP indicated by the receiving operator for transmitting the communication is the first form of SIP used by the originating operator in the invitation;
- if the preferred protocol is the second form of SIP, convert the invitation from the first form of SIP to the second form of SIP before forwarding the invitation; and
- forward a first part of said invitation towards an originally-addressed network node of the receiving operator and a second part of said invitation towards another network node of the receiving operator, whereby an inter-operator interface stays the same for the originating operator.

13. The communications system according to claim 12, wherein the second network comprises two or more network nodes via which invitations and communication can be forwarded;

wherein the system is configured to maintain information on the receiving operator's definitions for incoming media types, the information indicating which network node of the two or more network nodes is to be used for transmitting a specific media type; and wherein the intermediate network node is configured to determine the incoming media type of the communication, to determine the network node which is to be used for said media type according to the definitions of the receiving operator, to use one of the first and second forms of SIP supported by the determined network node as the preferred form of SIP, and to forward the invitation to the determined network node regardless of the target address of the network node the originating operator has defined for the invitation.

14. The communications system according to claim 12, wherein the system comprises a third network having the originating operator and supporting at least the second form of SIP for transmitting a communication;

wherein the second network comprises two or more network nodes via which invitations and communications can be forwarded;

wherein the system is configured to maintain a rule set and updatable by the receiving operator, the rule indicating the preferred protocol by defining that at least one of incoming invitations transmitted using a first form of SIP is routed towards a first network node of the receiving operator and that at least one of incoming invitations using a second form of SIP is routed towards a second network node of the receiving operator; and wherein the intermediate network node is configured to forward the invitation to a network node determined by the rule regardless of the target address of the network node the originating operator has defined.

* * * * *